(12) United States Patent
Benson et al.

(10) Patent No.: US 10,431,054 B2
(45) Date of Patent: Oct. 1, 2019

(54) SYSTEM AND METHOD FOR IDENTIFYING IMMINENT DROPPING OF A DEVICE AND PROVIDING A WARNING OF THE IMMINENT DROPPING

(71) Applicant: Sony Interactive Entertainment Europe Limited, London (GB)

(72) Inventors: Simon Mark Benson, London (GB); Sharwin Winesh Raghoebardajal, London (GB); Patrick John Connor, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 15/986,298

(22) Filed: May 22, 2018

(65) Prior Publication Data

US 2018/0342135 A1 Nov. 29, 2018

(30) Foreign Application Priority Data

May 24, 2017 (GB) .................................. 1708310.6

(51) Int. Cl.
*G08B 21/00* (2006.01)
*G08B 1/08* (2006.01)
(Continued)

(52) U.S. Cl.
CPC ................ *G08B 1/08* (2013.01); *A63F 13/21* (2014.09); *A63F 13/214* (2014.09);
(Continued)

(58) Field of Classification Search
CPC ...... A63F 13/21; A63F 13/214; A63F 13/218; A63F 13/98; G08B 1/08; G08B 21/18; G08B 23/00
See application file for complete search history.

(56) References Cited

U.S. PATENT DOCUMENTS

| 5,585,785 A | 12/1996 | Gwin et al. |
| 2004/0032334 A1 | 2/2004 | Haq |

(Continued)

FOREIGN PATENT DOCUMENTS

| CN | 202702989 U | 1/2013 |
| CN | 204037150 U | 12/2014 |

OTHER PUBLICATIONS

Combined Search and Examination report for GB 1708310.6 dated Aug. 14, 2017, 8 pages.
(Continued)

*Primary Examiner* — Andrew W Bee
(74) *Attorney, Agent, or Firm* — Lerner, David, Littenberg, Krumholz & Mentlik, LLP

(57) ABSTRACT

A processing system adapted for use in a gaming environment is configured to detect when a user might accidentally drop an input device, such as a handheld game controller. The processing system includes an input device, a processing unit and a warning unit. The input device has one or more pressure sensors operable to sense pressure inputs from a user. The processing unit is operable to identify an imminent dropping of the input device from measurements obtained by the pressure sensors. And the warning unit is operable to provide a warning to the user when the processing unit identifies an imminent drop of the input device.

16 Claims, 3 Drawing Sheets

(51) Int. Cl.
*G08B 23/00* (2006.01)
*G08B 21/18* (2006.01)
*G06F 3/01* (2006.01)
*G06F 3/02* (2006.01)
*G06F 3/03* (2006.01)
*A63F 13/21* (2014.01)
*A63F 13/214* (2014.01)
*A63F 13/218* (2014.01)
*A63F 13/98* (2014.01)
*G06F 3/023* (2006.01)
*G06F 3/038* (2013.01)
*G06F 3/0346* (2013.01)
*G06F 3/041* (2006.01)

(52) U.S. Cl.
CPC ............ *A63F 13/218* (2014.09); *A63F 13/98* (2014.09); *G06F 3/01* (2013.01); *G06F 3/02* (2013.01); *G06F 3/023* (2013.01); *G06F 3/0219* (2013.01); *G06F 3/03* (2013.01); *G06F 3/038* (2013.01); *G06F 3/0346* (2013.01); *G08B 21/18* (2013.01); *G08B 23/00* (2013.01); *A63F 2300/8082* (2013.01); *G06F 3/011* (2013.01); *G06F 3/0414* (2013.01)

(56) References Cited

U.S. PATENT DOCUMENTS

| | | |
|---|---|---|
| 2007/0211035 A1 | 9/2007 | Marcus et al. |
| 2007/0300002 A1* | 12/2007 | Burnham ............ G11B 33/025 710/303 |
| 2009/0303204 A1 | 12/2009 | Nasiri et al. |
| 2010/0248822 A1 | 9/2010 | Migos et al. |
| 2011/0043350 A1* | 2/2011 | Ben David ............ B60Q 9/00 340/441 |
| 2014/0345956 A1* | 11/2014 | Kojina ............. B62B 5/0073 180/6.5 |
| 2016/0363996 A1 | 12/2016 | Higgins et al. |
| 2017/0135513 A1* | 5/2017 | Geurts ............. A47J 27/2105 |
| 2017/0176268 A1* | 6/2017 | Kihara ................ G01L 1/16 |
| 2017/0337804 A1* | 11/2017 | Yang .................. G08B 23/00 |

OTHER PUBLICATIONS

Extended European Search Report of EP Application No. 18173408.8, dated Sep. 27, 2018.

* cited by examiner

SYSTEM AND METHOD FOR IDENTIFYING IMMINENT DROPPING OF A DEVICE AND PROVIDING A WARNING OF THE IMMINENT DROPPING

CROSS REFERENCE TO RELATED APPLICATIONS

The present application claims the benefit of and priority to GB Application No. 1708310.6, filed May 24, 2017, the entire disclosure of which is incorporated by reference herein.

BACKGROUND OF THE INVENTION

Field of the Invention

This invention relates to an input device and method.

Description of the Prior Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The use of head-mountable displays (HMDs) has become increasingly common in recent years. These are used to provide virtual or mixed reality images to a user, often to provide an enhanced gameplay experience by increasing the level of immersion that is experienced by a user.

While an increased level of immersion may be beneficial with regards to the enjoyment of entertainment content, it can cause many problems. One of these problems is that the user forgets that they are interacting with the virtual environment using a controller; instead, they are led to believe that they are handling the object that is displayed in the virtual environment. The user, when discarding the virtual object, may be led to accidentally drop the controller in such an arrangement.

Existing methods for addressing such a problem comprise providing a wrist-strap or the like so as to tether the controller to a user. This may not be entirely satisfactory, as it may be uncomfortable for a user and it may still be confusing for a user to try and locate a controller in the real environment while immersed in a virtual environment even if it is still connected to the user via a strap.

In addition to the above problem, users may intentionally seek to place their controller down whilst being immersed in such an environment; however this can lead to the user trying to place the controller on a surface that is only present in the virtual environment.

As a result, peripherals being used by the user are at risk of becoming damaged due to dropping the controller unintentionally or in an undesirable location.

It is an aim of the present disclosure to mitigate this problem.

SUMMARY OF THE INVENTION

Various aspects and features of the present invention are defined in the appended claims and within the text of the accompanying description and include at least an apparatus and a method, as well as a computer program.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
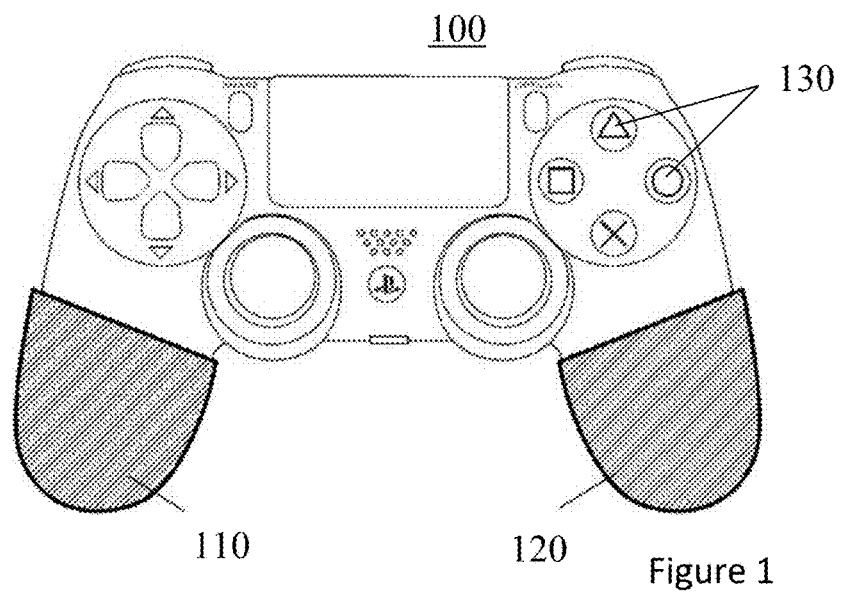
FIG. 1 schematically illustrates an input device provided with pressure sensors.

Referring now to the drawings, wherein like reference numerals designate identical or corresponding parts throughout the several views, FIG. 1 schematically illustrates an input device 100 used for providing commands to an associated processing device. The input device 100 comprises pressure sensors 110 and 120 in addition to input buttons 130. The input device 100 is an example of a controller, as it may be used to control processing performed by an associated processing device, and as such the terms 'input device' and 'controller' may be used interchangeably in the following description.

An input device 100 according to the present disclosure may comprise any number of input buttons 130; indeed, this number could be zero in the case of an input device that provides inputs based upon a user's motion rather than button presses.

The location and number of pressure sensors 110 and 120 are also exemplary; only one of these sensors may be provided, or a greater number could be present on the input device. The sensors 110 and 120 could cover only a front or rear portion of the controller, instead of covering the whole surface of the arms. Rather than being located on the arms of the controller, the sensors may be provided on any region of the controller in which it is convenient for the user to provide a pressure to the sensor.

Each of the pressure sensors 110 and 120 may comprise a single pressure-sensitive region in the case in which only one sensing element is provided. However, in some embodiments it is considered advantageous to provide a number of individual sensing elements in each pressure sensor 110 and 120.

This could allow a greater ability to determine which pressure was intended to be applied by the user; for example, it may be possible to determine a direction from which the pressure is applied or it may simply increase the area in which a user may apply a pressure. Alternatively, or in addition, a plurality of sensing elements may be provided for each pressure sensor to allow a user to provide localised pressure inputs in different places that may be interpreted as different inputs.

While the pressure sensors are described as being integrated with the controller, it is apparent that removable sensors could be used. For example, if a user wishes to use the sensors with an older controller that was produced before sensors were available then retrofitting such sensors to a controller may be beneficial.

Suitable pressure sensors include, but are not limited to, piezo-resistive strain gauges, piezoelectric pressure sensors, and inductive/reluctive pressure sensors.

It will be appreciated that a pressure sensor is different to a touch sensor, such as may be found on a mobile phone screen, or laptop; the user will typically hold (and thus touch) the device and pressure sensor, but needs to apply additional pressure over and above mere touch in order to safely hold the controller in normal use. Optionally still further pressure may be selectively applied by a user to constitute a pressure input (or a pressure input that exceeds a predetermined detection threshold). Similarly, it will be appreciated that a pressure sensor is different to a push switch or button, which physically moves from an off position to an on position when sufficient pressure is applied and hence requires a visible actuating movement on the part of the user.

Figure 2:
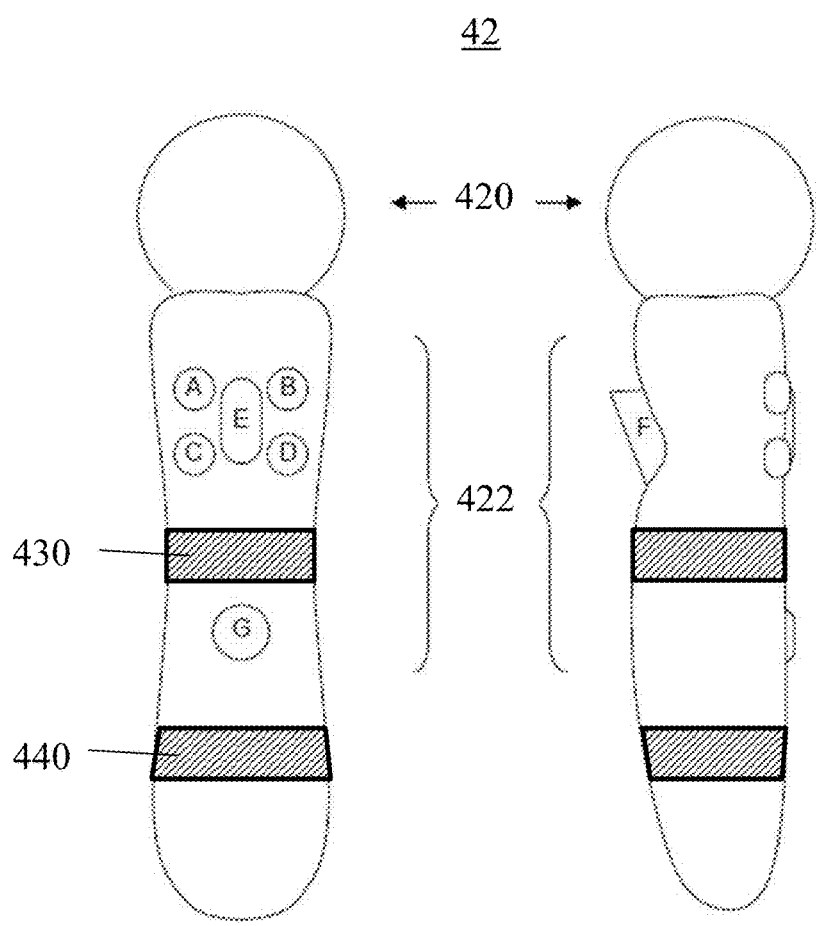
FIG. 2 schematically illustrates an alternative input device provided with pressure sensors.

FIG. 2 schematically illustrates a PlayStation Move® controller 42 as a further example of a controller that may comprise pressure sensors.

The controller 42 comprises a tracking object 420 such as an illuminated ball, which may be used to optically track the controller's position in space by a camera connected to a host device apparatus (typically a videogame console such as the PlayStation 4® or PC, but potentially a server providing a streamed gaming experience). Other VR controllers may use a different configuration of optical tracking objects, or not include these at all and optionally instead use means such as magnetism, ultrasound, GPS, picocell/WiFi® radio triangulation, laser or light interferometry and/or accelerometer/gyroscope sensors (e.g. MEMs devices), or other suitable motion tracking techniques localised in the controller, the console (or a separate sensor peripheral) or any combination of the above.

The controller 42 also comprises a number of inputs 422, here labelled A-G. The position and number of controls in the figures are purely exemplary. These controls may be arranged in any manner suitable to the functioning and ergonomics of the controller. In the illustrated example, there are three basic groups; buttons A-D may correspond to buttons on a standard videogame controller and have corresponding functions, and similarly button E may correspond to a button on the standard controller such as a trigger or action button, but transposed relative to buttons A to D so as to be easily accessible by the user's thumb. Button F is a trigger typically used with an index finger. Finally, button G is physically separate from the other buttons to avoid accidental use and may be used to trigger or select.

The controller 42 is further provided with pressure sensors 430 and 440 that are provided in separate areas of the controller. The greater number of sensors may be provided so as to provide a user with a greater range of possible pressure inputs, or simply so as to ensure that a user is always in contact with at least one sensor independently of how they are gripping the controller.

Pressure sensors as described above may be operable to measure a variety of inputs in dependence upon the actions of the user. For example, inputs could be differentiated by the duration or hardness of the application of pressure to the sensor. If an input device is equipped with more than one pressure sensing element, the order in which pressure is applied to these elements may also be recorded; in some embodiments, the sensing elements may have pressure applied simultaneously which may also be recorded.

A long-term average value for a pressure signal can be maintained, which is indicative of a nominal holding pressure for the device. This may be established during an explicit calibration phase, or during a period of use that does not correspond to gameplay or password entry using the pressure technique. Then a predetermined threshold corresponding to a value proportionately lower than that long-term average value (for example N % or M standard deviations from the value, where N and M are designer choices) may be used to classify a reduction in the squeezing of the controller's pressure sensor(s).

While FIGS. 1 and 2 illustrate handheld devices, it would be appreciated that other input devices may be appropriate. For example, a wristband or armband that is in contact with the user's skin may be equipped with sensors that detect the motion of the user's muscles as an outwards pressure on the band. A user could then perform a predetermined set of hand gestures or the like in order to produce a specific pattern of muscle motion which in turn is measured as a pattern of pressure inputs on the band. The input device may therefore be wearable upon the user's body.

The input devices as described above may communicate information about the pressure inputs in any suitable way. For example, a wired connection or a wireless connection (such as BlueTooth®) may be appropriate. Alternatively, or in addition, each of the input devices described above may be provided with a light source (such as the tracking object 420 in FIG. 2) that is operable to transmit information about the pressure inputs that is detectable by a camera associated with the processing device.

As a further alternative, the input device and an associated processing device could be formed in a single unit (for example a portable device such as a hand held games console or mobile phone). In such a case, a large portion of the portable device may comprise a touch screen. Hence the pressure sensor may be located on a back panel of the device or incorporated into a rim or edge of the device. In this latter case, the sensor may be arranged to detect pressure directed towards the rim, or in an orthogonal arrangement, may be arranged to detect pressure corresponding to the user squeezing the front and back surfaces of the portable devices together, optionally at a particular location of the device near the sensor. Clearly this squeezing action may also be detected by a sensor coupling the front and back surfaces of the device.

Figure 3:
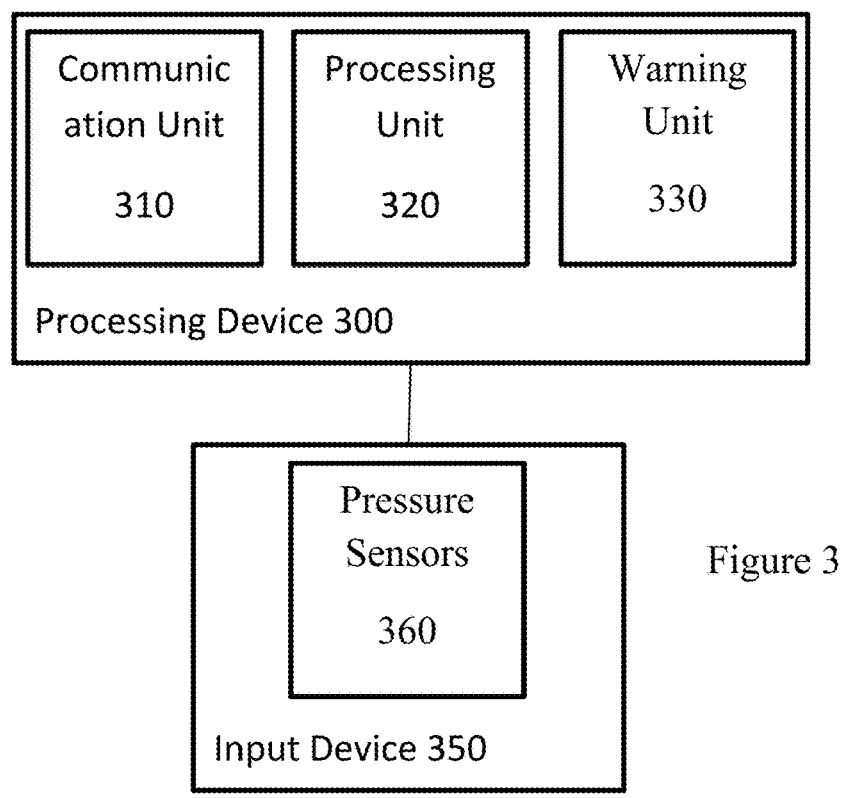
FIG. 3 schematically illustrates a processing system.

FIG. 3 schematically illustrates a processing system comprising a processing device 300 and an input device 350 which are able to perform wired or wireless communication using any suitable method. The input device 350 comprises one or more pressure sensors 360, and may be either of those input devices illustrated in FIGS. 1 and 2, or integral to the processing device (as in the case of a portable device), or indeed any input device with pressure sensors.

The processing device 300 comprises a communication unit 310, a processing unit 320 and a warning unit 330. The communication unit 310 is operable to communicate with the input device 350, for example to receive controller inputs via buttons on the controller, pressure sensors on the controller, or tracking information for the controller. The processing unit 320 is operable to process the received controller inputs and modify the operation of the processing device in response to the inputs. The warning unit 330 is operable to generate and provide warnings to a user relating to imminent dropping of the input device; these warnings may be effected through the input device itself, the processing device 300 or a display associated with the processing device 300.

The processing device 300 is an example of a processing device for use with an input device 350.

The communication unit 310 is operable to receive inputs from the input device, the inputs corresponding to at least the operation of the one or more pressure sensors. In some embodiments, the communication unit 310 comprises a wired or wireless receiver. Alternatively, or in addition, the communication unit 310 comprises a camera.

The processing unit 320 is operable to identify an imminent dropping of the input device from measurements obtained by the pressure sensors, as is described below.

The warning unit 330 is operable to provide a warning to a user when the processing unit identifies an imminent drop.

The input device 350 is an example of an input device comprising one or more pressure sensors operable to sense pressure inputs from a user, wherein a warning is provided to the user when a change in the sensed pressure inputs is identified as being indicative of an imminent dropping of the input device.

Figure 4:
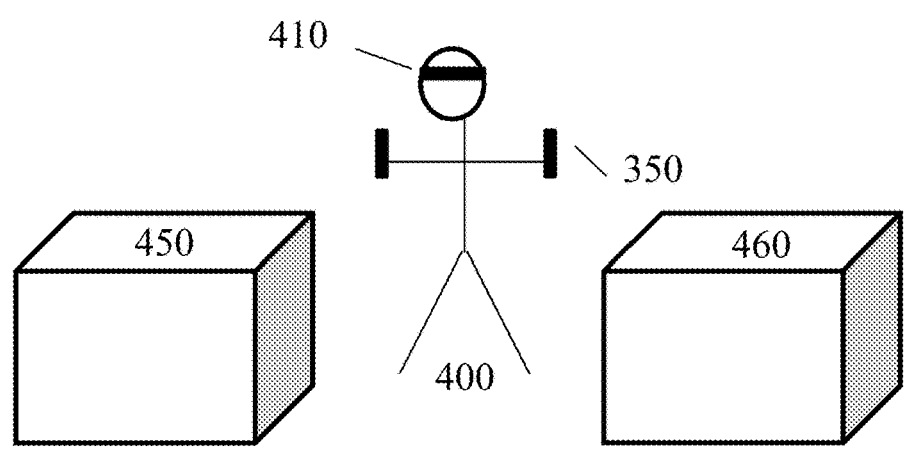
FIG. 4 schematically illustrates a user using an HMD.

FIG. 4 schematically illustrates an environment in which an HMD and associated controllers are being used.

The user 400, using the HMD 410 and input devices 350, is located between a pair of surfaces 450 and 460. In this example, we consider that the surface 450 exists only in the virtual environment that is presented to the user 400 whilst the surface 460 appears in both the real and virtual environments.

While described with reference to the use of an HMD 410, such an arrangement is suitable with any display type. For example, if a user is particularly attentive of content displayed on a television they may forget that they are holding a controller. Equally, the arrangement could be extended to a portable device such as a portable console or mobile phone in which the display is also included as a part of the processing device.

Two exemplary scenarios are considered with respect to this arrangement; one in which a user unintentionally drops a controller and one in which a user intentionally drops a controller, but in an inappropriate location. It may be possible to differentiate between the two actions based upon the rate at which the user's 400 grip strength changes (for example, an intentional drop may be identified as a slower change in the pressure applied to the controller by the user); otherwise, the two scenarios are similar in that a warning should be provided to the user to prevent the dropping and the latter provides an example in which the location of the input device 350 is accounted for.

As an example of the first scenario, it is considered that a user may wish to drop a virtual in-game object. In an immersive environment, it may be common to attempt to provide inputs that seem natural (such as simply opening the hand) rather than the correct input (such as pressing a button). As a result, when a user attempts to drop the virtual object they may inadvertently do so by dropping the controller. The likelihood of this may be further increased when attempting to place the virtual object on a surface 450/460 present in the virtual environment as the user has already begun the action of moving towards the surface and so may instinctively let go of the controller as a natural conclusion to that action.

An example of the second scenario is that of a user wishing to take a break from gameplay, and place a controller on a surface before removing an HMD. In such a scenario, the user may intend to place the input device 350 on a surface 460 that is present in the real environment, but instead mistakenly attempt to place the controller on a surface 450 that exists only in the virtual environment.

One distinction between these two scenarios is in that in the first scenario the user believes they are only manipulating a virtual object, and as a result is likely to be much less considerate of the potential for damage. As a result, the letting go of the controller in the first scenario is likely to be much more energetic and forceful than that of a letting go in the second scenario.

In order to prevent damage to the controller resulting from a drop, it may be desirable to anticipate such a drop and warn the user of an imminent drop before it occurs.

As noted above, each of the input devices 350 may be provided with pressure sensors that are operable to detect an amount of pressure that is associated with the strength with which the user 400 is gripping the input device 350. By monitoring how much pressure is being applied to the input devices 350 using the pressure sensors, it is possible to determine that a user 400 is weakening their grip on the input device 350. This is a necessary step in the dropping process, as an instantaneous change in grip strength is not possible, and so it is possible to determine from such a measurement that the input device 350 is to be dropped imminently.

An imminent dropping may be identified by any corresponding change in sensor readings, often a decrease in the amount of pressure that is applied to the controller by the user's hands. It is desirable that an imminent dropping is distinguished from an intentional placing of the controller, methods by which this may be possible being described below, and as such the identification of an imminent drop may be different to that of determining that the user is letting go of the controller.

In response to such a determination, a warning can be provided to the user 400 to alert them to the imminent dropping. Such a warning may (for example) be visual and displayed on the HMD 410, tactile in that the input device 350 vibrates in a predetermined manner, or audible with the sound being emitted either by the HMD 410 or the input device 350 itself. Such a warning, while breaking the sense of immersion experienced by the user, can prevent dropping of the input device 350 and thus reduce the risk of damage and lower the chance of a greater break in immersion associated with removing the HMD 410 in order to find the input device 350 again.

Alternatively, or in addition, the input device may be operable to perform an action to reduce the risk of damage being sustained by the input device in response to an identification of an imminent drop A visual warning may comprise a message being displayed on screen to a user, or any other visual indicator; for example, displaying an icon representing an imminent drop on the screen. Alternatively, or in addition, a see-through effect may be provided using a camera associated with the HMD 410 in order to show the user the environment as an example of a warning comprising video content obtained using a camera associated with the HMD. Such a feature could be advantageous in assisting the user when intentionally letting go of the controller, for example to help with locating the surface and avoid any objects already on the surface. The see-through effect could encompass the whole display, or be provided as a picture-in-picture type image.

A tactile warning generally comprises a vibration of the input device 350. This may be particularly effective in reminding a user that they are holding a controller rather than the object depicted in-game, as the vibration is a direct indication that the user has a physical object in their hands.

The intensity, or any other variable, may be modified to represent a user's grip strength and therefore how likely a drop is.

An audible warning may be provided by the display device, input device, or any other device associated with the system that is capable of audio output. A warning may be simple, such as a beep that reminds a user not to loosen their grip further, or more descriptive in verbally informing a user that they are close to dropping their controller. In order to reduce the break in immersion, it may be possible that an in-game character informs the user of the imminent drop; for example, by telling a user that they should be more careful with the in-game object held by the user's in-game character.

The selection of which warnings to use may be selected in dependence upon user preferences, or in dependence upon the application; for example, a less intrusive warning may be used in an application in which a greater degree of immersion is desired. Equally, the selection of warnings could be based upon the available hardware. For example, a controller with no tactile feedback features is clearly incapable of providing such feedback. It should be appreciated that more than one type of warning may be provided to a user, in succession or in conjunction with one another.

The severity of warnings may also be varied in dependence upon the likelihood of damage to the input device. This may be a warning that varies over time to reflect a changing grip strength, or a warning that varies in dependence upon how robust the input device is (and thus how big a drop it can sustain before being damaged). Determining an appropriate severity of a warning could also comprise identifying environmental features; for example, using a camera associated with the processing device to identify the location of tables or the like, or the type of flooring that is present in the room (as, for example, a carpet will provide a softer, less damaging landing than a hardwood floor).

Alternatively, or in addition, sensors could be associated with the input device that may be used to detect a proximity of the input device to a surface.

As a further alternative or additional method, a user may be able to define the location of surfaces within the environment. This may be performed, for example, by positioning objects on a display to indicate their real-world positions within the environment, or by using motion tracking of a controller to trace or otherwise indicate the location of a surface.

It will be appreciated that the user may shift their grip on the controller on a regular basis, for example for comfort, and so it would be preferable to avoid false-positive warnings of an imminent drop each time the user loosens their grip.

Accordingly in an embodiment of the present invention, the system only issues warnings if the user's hand is palm-down; i.e. if a subsequent loosening of the fingers would cause the controller to fall down out of the user's hand (it will be appreciated that when palm alp, the controller would remain resting in the user's hand.

This may be determined in one of several ways. Firstly, a camera may be associated with the processing device or HMD. This may analyse a captured image of the controller to detect the orientation of the user's hand.

Alternatively or in addition, telemetry from the controller will indicate if the controller is substantially vertical or horizontal, and if horizontal, whether this is consistent with the user's palm being up or down (e.g. a controller pointing horizontally to the right in the user's right hand is consistent with the user's right hand being palm up. Meanwhile controller pointing horizontally to the right in the user's left hand is consistent with the user's left hand being palm down).

More generally, a respective predetermined range of orientations for the controller may be determined for left or right hand held controllers that are deemed safe (or conversely unsafe) when the user releases or reduces their grip. The processing device or HMD may then signal a warning accordingly.

It will similarly be appreciated that different holding positions may require more or less pressure to safely hold the controller, for example due to additional factors such as friction. Hence more pressure will be required when holding the controller palm-down (where the controller could roll out of loose fingers) than when holding the controller vertically (where the controller would need to slip down past each of the user's fingers). Hence the pressure threshold for triggering a warning may likewise be made dependent on the orientation of the controller, and may be determined by reference to respective predetermined ranges of orientations determined for left or right hand held controllers.

It will also be appreciated that even where a warning is suppressed or not selected due to the held orientation of the controller, a warning may be given if the controller nevertheless moves in a manner that indicates loss of control. Hence if the controller appears to roll or rotate about its own axis whilst the pressure on the controller is below a predetermined threshold, then regardless of any previously described criteria, a warning may optionally be given.

Considering now the second exemplary scenario, in which the user intentionally places a controller but in an inappropriate real-world location, it is apparent that it should be possible to determine how appropriate a location is for letting go of an input device.

In some embodiments, the input device 350 is provided with a sensor that is operable to detect nearby surfaces, such as an infra-red detector that is arranged to determine the presence of proximate objects. In such an embodiment, it is possible to correlate the loosening of the user's 400 grip with the detection of a nearby surface; if the two occur at the same time, then there is unlikely to be significant controller damage if the drop is unintentional, and it can be considered allowable for the user to drop the controller even if is not intentional. If the loosening of the grip does not coincide with the detection of a nearby surface, a warning may be provided as described above.

Alternatively, or in addition, a camera may be associated with the processing device 300 or HMD 410. The camera may be arranged so as to be able to capture images of the input device and the user; in some embodiments images of the surrounding environment are also captured by the camera. Identification of the input device in the captured images may be facilitated by the use of a recognisable pattern, such as an AR marker or a predetermined pattern on lights, associated with the input device.

By performing appropriate image processing to identify additional objects in the captured images, it is possible to determine whether a user is about to place the input device on a surface or if it would drop to the floor if the user were to let go. In some embodiments, warnings may be generated only when a user seeks to place the input device on a surface that only exists in the virtual environment (or does not exist at all).

The camera could be used to track the relative positions of the objects and input device simultaneously, or the camera could be used to generate a model of the environment in which the user is playing. In the latter case, the position of the input device may be mapped into the model of the environment to determine the relative distances between the input device and any objects. While this may require some form of setup or calibration period, it can reduce the processing requirements during use of the input device.

In embodiments in which a camera is associated with the system, a warning may only be provided to the user if the input device is greater than a threshold distance from a surface. For example, the surface could be detected by its presence in images captured by the camera, by a user indication of the surface location, laser scanning or any other suitable method for detecting or identifying surfaces. This condition should be fulfilled in conjunction with sensing of an imminent drop using the pressure sensors. This is advantageous in that a user may safely put down the controller when intended without generating warnings; equally, if the user has misjudged the distance to the surface they can be warned that the drop is too large. In some embodiments, this may be extended so as to identify if a user would drop the controller onto objects that are already present on the surface to avoid collisions between them.

Other measurements or conditions may be used in conjunction with the measurement of the pressure applied to the controller by the user's grip in order to assist in characterising the change in sensed pressure. These other measurements and conditions may be used either alone or in conjunction with one or more of the other measurements and conditions as is appropriate.

For example, the rate at which the user's grip strength changes could be used to characterise the action. The rate at which a user's grip strength changes is a function of the change in the pressure applied to a controller, as detected by the pressure sensors, and the time taken for the change to occur. In general, a slower loosening of the grip may be associated with an intentional letting go of the controller as a user would likely place an object down gently in such a scenario. This can result in the warning being shown when pressure inputs change at a rate above a threshold amount.

Alternatively, or in addition, the measurement of a lower-than-threshold grip strength may be required before a warning is generated. This may be advantageous in scenarios in which a user is gripping tightly and loosens their grip but not by a sufficient amount to actually drop the controller. Such a threshold may be an absolute value of pressure applied, or may be a percentage of the maximum or average pressure applied, for example. This can result in the warning being shown when pressure inputs fall below a threshold amount.

Similarly, the measurement of a threshold change in grip strength may be required before a warning is presented to a user. This may be advantageous in allowing a user to vary their grip strength within a particular range without generating warnings unnecessarily. This can result in the warning being shown when pressure inputs change by at least a threshold amount. This threshold could be an absolute value of change in applied pressure, or may be expressed as a percentage of the initial grip strength. This change in grip strength may also be required to occur in less than a threshold amount of time; a change in grip strength over a longer period of time may be indicative of a user relaxing, rather than letting go of the controller, for example.

It is also considered that a pattern of pressure inputs may be considered in determining whether a drop is likely. For example, the action of a user placing an object down and interacting with the controller may be different; by detecting which pressure sensors are experiencing a different input it may be possible to determine whether the user is dropping a controller or not.

It is envisioned that a pattern of pressure sensor readings could be recorded for any drops that do occur; if there is a particular pressure pattern that often leads to the user letting go of the controller then this could be recognised in order to provide more tailored (and potentially earlier) warnings.

Alternatively, or in addition, motion sensors and/or cameras or the like may be used to characterise the actions of the user. For instance, if a user stands still and loosens their grip slightly it is unlikely that they are about to drop the controller. This is contrasted by a scenario in which a user motions to place an object on a table, for example, in which it is more likely that a user will drop the controller due to it being a more natural motion for putting an object down. This could be recognised by a user bending and turning to the side, or the controller moving both down and to the side. As a result, a warning may be provided to the user when the user performs a predetermined motion in conjunction with a change in pressure inputs This could also be extended to consider features present in the virtual environment that is displayed to the user. For example, if a user is motioning towards placing an object on a surface (such as the surface 450 in FIG. 4) that exists only in the virtual environment, then a warning may be generated when the same action towards surface 460 that also exists in the real environment would not generate an equivalent warning.

Rather than each of the above considerations resulting in a binary 'warning' or 'no warning' outcome, they may be used to provide a graded response. For example, as the likelihood of a damaging drop increases the urgency of the warning that is to be provided to the user may be increased. In some embodiments, this may be a louder warning noise being generated with increased likelihood, or a larger or more prominent visual warning being displayed; however, any suitable method for conveying a more urgent warning may be utilised in such embodiments.

In some embodiments, either instead of or in addition to the warning being provided, the input device may be operable to perform an action to prevent (or at least reduce the risk of) damage being sustained. For example, the input device may be operable to perform an action that shields sensitive or fragile components, or prevents the user from dropping the device. An example of the first is in having a retractable cover that may be drawn back during use (such as for protecting a camera or the like) that extends when an imminent drop is detected. In a second exemplary embodiment, the device may be provided with a wrist strap or the like that may be tightened in response to the detection of an imminent drop.

Figure 5:
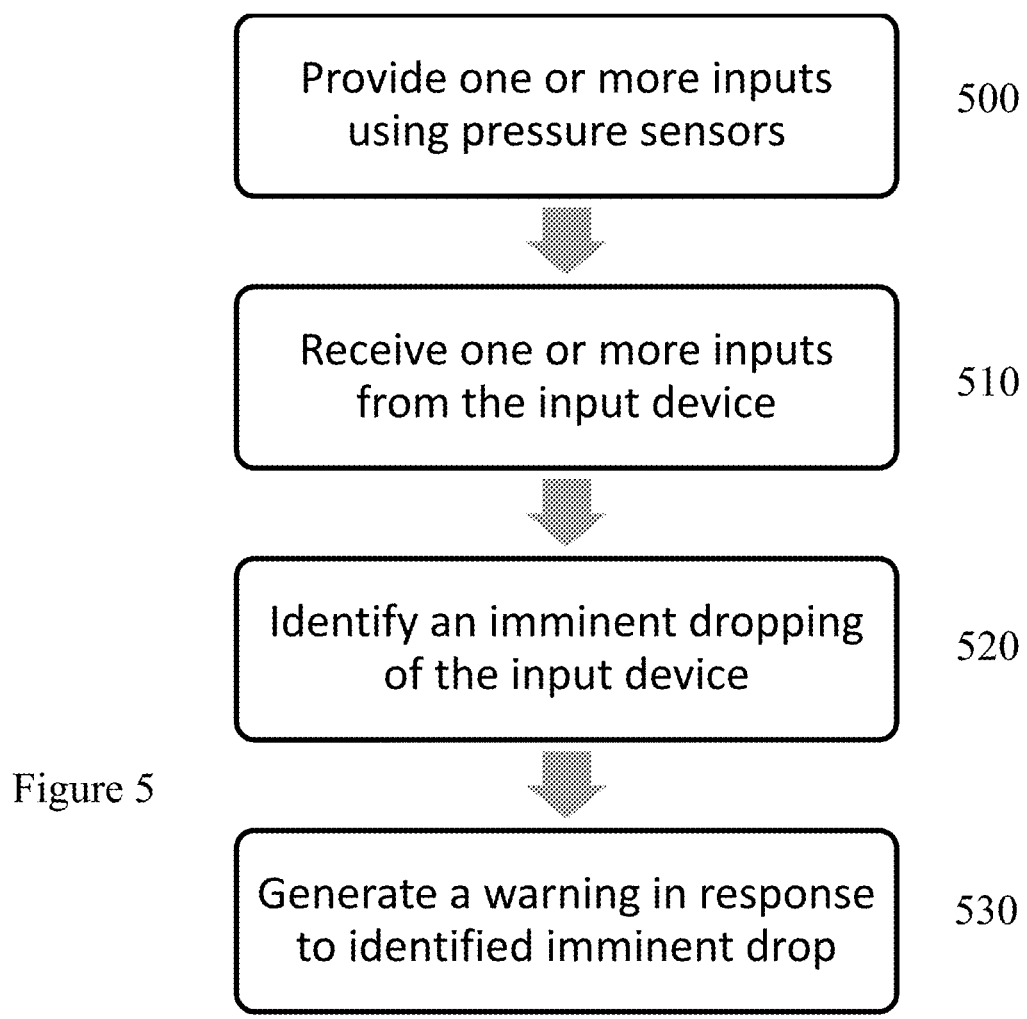
FIG. 5 schematically illustrates a drop-detection method.

FIG. 5 schematically illustrates a pressure-sensing method for use with an input device, wherein the method is used to generate warnings to a user about dropping the input device when appropriate.

A step 500 comprises providing one or more inputs using the pressure sensors on the input device.

A step 510 comprises receiving, at a processing device, one or more inputs from the input device, the inputs corresponding to the operation of the one or more pressure sensors. It is not required that the inputs provided correspond to in-game actions or the like, rather an input should be considered to be any measurement made by the pressure sensors of the input device.

A step 520 comprises identifying an imminent dropping of the input device from measurements obtained by the pressure sensors, such as the inputs received in the step 510.

A step 530 comprises generating a warning in response to an imminent drop being identified. This warning may be provided to a user when a change in the sensed pressure inputs is identified as being indicative of an imminent dropping of the input device.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

It will be appreciated that the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A processing system comprising:
   an input device comprising one or more pressure sensors operable to sense pressure inputs from a user; and
   a processing unit operable to identify an imminent dropping of the input device from measurements obtained by the one or more pressure sensors, and to affect a warning to the user when the processing unit identifies an imminent drop.

2. A processing system according to claim 1, wherein the warning comprises one or more of an audible, a visual and a tactile component.

3. A processing system according to claim 2, wherein the processing system is configured to cause an audible warning as the audible component to be output by one or more of the input device, the processing device or a display device.

4. A processing system according to claim 1, wherein the input device is operable to perform an action to reduce a risk of damage being sustained by the input device in response to an identification of an imminent drop.

5. A processing system according to claim 1, wherein the processing system is configured to cause the warning to be shown when a condition is met, the condition including one or more criteria selected from the list consisting of:
   i. when pressure inputs fall below a threshold amount;
   ii. when pressure inputs change by at least a threshold amount; and
   iii. when pressure inputs change at a rate greater than a threshold amount.

6. A processing system according to claim 1, further comprising a camera arranged to capture images of the input device and the user.

7. A processing system according to claim 1, wherein the processing system is configured to cause the warning to be provided to the user in response to the user performing a predetermined motion in conjunction with a change in pressure inputs.

8. A processing system according to claim 1, wherein the processing system is configured to cause the warning to be provided to the user only if the input device is greater than a threshold distance from a surface.

9. A processing system according to claim 1, further comprising a head-mountable display.

10. A processing system according to claim 9, wherein the warning comprises video content obtained using a camera associated with the head-mountable display.

11. A processing system according to claim 1, in which the processing system further comprises a communication unit operable to receive inputs from the input device, the inputs corresponding to operation of the one or more pressure sensors, and
   wherein the processing unit comprises a processor operable to generate, in dependence upon the received inputs, a warning to be provided to the user when a change in the sensed pressure is identified as being indicative of an imminent dropping of the input device.

12. The processing system of claim 11, in which:
   the communication unit is operable to receive inputs from the input device indicating an orientation of the input device; and
   the processor is operable to generate the warning responsive to both the sensed pressure and the orientation of the input device.

13. A pressure-sensing method for use with an input device comprising one or more pressure sensors operable to sense pressure inputs from a user, the method comprising:
   receiving, at a processing device, one or more inputs from the input device, the inputs corresponding to operation of the one or more pressure sensors;
   identifying an imminent dropping of the input device from measurements obtained by the one or more pressure sensors; and
   generating, in response to an imminent drop being identified, a warning to be provided to the user.

14. The pressure sensing method of claim 13, further comprising:
   receiving, at the processing device, one or more orientation inputs from the input device, the orientation inputs corresponding to the orientation of the input device;
   wherein the identifying step comprises identifying the imminent dropping of the input device responsive to both measurements obtained by the pressure sensors and the orientation of the input device.

15. A non-transitory computer-readable recording medium having instructions stored thereon, the instructions, when executed by a computer, causing the computer to perform a method comprising:
   receiving, at a processing device, one or more inputs from the input device, the inputs corresponding to operation of the one or more pressure sensors;
   identifying an imminent dropping of the input device from measurements obtained by the one or more pressure sensors; and
   generating, in response to an imminent drop being identified, a warning to be provided to the user.

16. The non-transitory computer-readable recording medium of claim 15, wherein the method further comprises:
   receiving, at the processing device, one or more orientation inputs from the input device, the orientation inputs corresponding to the orientation of the input device;
   wherein the identifying step comprises identifying the imminent dropping of the input device responsive to both measurements obtained by the pressure sensors and the orientation of the input device.

* * * * *